United States Patent [19]

Miyabayashi et al.

[11] Patent Number: 4,725,422
[45] Date of Patent: Feb. 16, 1988

[54] ELECTRODE MATERIAL

[75] Inventors: Mitsutaka Miyabayashi; Akira Itsubo; Yoshitomo Nakano; Masami Takahashi, all of Mie; Mituru Ueda, Yamagata, all of Japan

[73] Assignee: Mitsubishi Petrochemical Co., Ltd., Tokyo, Japan

[21] Appl. No.: 36,176

[22] Filed: Apr. 8, 1987

Related U.S. Application Data

[63] Continuation of Ser. No. 743,154, Jun. 10, 1985, abandoned.

[30] Foreign Application Priority Data

Jun. 12, 1984 [JP] Japan .................... 59-120499
Nov. 2, 1984 [JP] Japan .................... 59-230292
Nov. 2, 1984 [JP] Japan .................... 59-230293

[51] Int. Cl.$^4$ .................... C10B 31/00; C10B 31/04
[52] U.S. Cl. .................... 423/445; 264/29.1; 423/448; 423/449; 429/218
[58] Field of Search .................... 423/445, 448, 449; 264/29.1; 252/502; 429/218

[56] References Cited

U.S. PATENT DOCUMENTS

| | | | |
|---|---|---|---|
| 3,536,532 | 10/1970 | Watanabe et al. | 429/194 |
| 3,700,502 | 10/1972 | Watanabe et al. | 429/194 |
| 3,749,700 | 7/1973 | Stephens et al. | 423/449 |
| 3,792,155 | 2/1974 | Smith et al. | 423/445 |
| 4,146,576 | 3/1979 | Wyss | 423/449 |
| 4,271,242 | 6/1981 | Toyoguchi et al. | 429/194 |
| 4,273,675 | 6/1981 | Shiiki et al. | 264/29.1 |

FOREIGN PATENT DOCUMENTS

| | | | |
|---|---|---|---|
| 682417 | 3/1964 | Canada | 423/448 |
| 950626 | 2/1964 | United Kingdom | 264/29.1 |
| 968215 | 9/1964 | United Kingdom | 423/448 |

OTHER PUBLICATIONS

Agache et al., The Carbonaceous Mesophase Formed in the Pyrolysis of Graphitizable Organic Materials, Metahlography, vol. 3, No. 3, Sep. 1970, pp. 337–369.
A. N. Dey et al., J. Electrochem. Soc., Electrochemical Science, 1970, pp. 222–224.
Kirk-Othmer, Encyclopedia of Chemical Technology, 3rd Ed., vol. 4, 1978, pp. 689–692.

Primary Examiner—Gregory A. Heller
Assistant Examiner—Robert M. Kunemund
Attorney, Agent, or Firm—Oblon, Fisher, Spivak, McCelland & Maier

[57] ABSTRACT

An electrode material made of a carbonaceous material that is obtained by the pyrolysis of an organic compound capable of forming the graphite structure is disclosed. This carbonaceous material is such that the spacing of (002) planes, d002, is at least 3.37 Å and the crystallite size in the direction of c axis, Lc, is not more than 220 Å, as determined by X-ray wide-angle diffractiometry, and the line width $\Delta Hpp$ between peaks in the first differential of the absorption spectrum of electron spin resonance is at least 10 gauss. The electrode material made of such carbonaceous material is capable of providing a stable secondary battery that produces high electromotive force and which has high energy density.

9 Claims, 7 Drawing Figures

4,725,422

ELECTRODE MATERIAL

This application is a continuation of application Ser. No. 743,154, filed June 10, 1985, now abandoned.

BACKGROUND OF THE INVENTION

The present invention relates to a novel electrode material, more particularly to an electrode material that is made of a carbonaceous material having a specific pseudographite structure and electron state and which is capable of making a lightweight and non-polluting electrochemical cell having high energy and maximum power densities.

In order to meet the recent requirement for using less energy in industries and to make the most of the rapid progress of electronic devices, it is strongly desired to develop new batteries which are light in weight and small in size and which produce great electromotive force and exhibit high maximum power and energy densities.

The present invention provides an electrode material suitable for use as battery electrodes. When positive and negative electrodes made of the material of the present invention are submerged in a liquid electrolyte, an electromotive force can readily be generated by applying an external voltage so that the positive electrode is doped with negative ions, and the negative electrode with positive ions. Thereafter, the electrodes are connected to an external load and a current is caused to flow by removing the respective ions from the positive and negative electrodes. This cycle of doping ions and removing them can be used as electrochemical charge and discharge reactions in the battery.

A battery may also be constructed by using one electrode which is made of the material of the present invention and the other electrode made of a known material.

The use of carbonaceous materials as electrode materials is already known. For example, it is reported in *J. Electrochem. Soc.*, 125, 687 (1978) that when metallic lithium is used as the negative electrode and graphite as the positive electrode, $BF_4^-$, $ClO_4^-$ or $I^-$ can be doped between graphite layers during charging and such ions are removed by discharging, thus producing reversible charge-discharge cycles. However, the negative ions doped between graphite layers repel each other and this puts limits on the amount of negative ions that can be doped electrochemically. Furthermore, the cell produces an energy density as low as 100 W.h/kg and no higher energy densities can be obtained. If graphite is used as the negative electrode, positive ions such as $Li^+$ ions can be doped between graphite layers but such positive ions are very unstable within the liquid electrolyte and will easily react with it.

The use of activated carbon fibers as the material for the two electrodes is disclosed in Japanese Patent Application (OPI) Nos. 58-35881 and 59-149654. But the cells using such electrode materials generate an electromotive force as low as 1.2 to 2.9 volts. The cells have low energy densities while experiencing high self-discharge after charging.

Japanese Patent Application (OPI) No. 58-93176 proposes a cell configuration that uses as the material for both electrodes a carbonaceous pyrolyzed polymer. But this cell produces low electromotive forces in the range of 1.2 to 1.4 volts and their short circuit current is as low as 30 $\mu$mA to 4 mA. Additionally, the cell has a fairly low energy density.

The use of an electroconductive polymer (e.g., polyacetylene or polyparaphenylene) as an electrode material is reported in *Kotai Butsuri* (Solid-State Physics), 17 (12), 753 (1982). When polyethylene was used as the material for both electrodes, the cell generated an electromotive force of 2.5 volts, an energy density of 150 W.h/hr and a maximum power density of 17 kW/kg. When a negative electrode made of metallic lithium and a positive electrode made of the polymeric material were used, the respective cell parameters were 3.5 volts, 290 W.h/kg and 3.5 kW/kg. In spite of these good values for cell performance, polyacetylene is unstable and is highly sensitive to oxidative deterioration, causing adverse effects on the cell performance such as cycle life. Furthermore, polyacetylene and polyparaphenylene are not easily dissolvable or meltable and cannot be shaped into various forms of electrodes by ordinary methods.

SUMMARY OF THE INVENTION

The present inventors made various studies to obtain an electrode material that is stable, generates a great electromotive force, has high maximum power and energy densities and which can be easily shaped into a variety of electrode forms. As a result, it has been found that this object can be achieved by using as an electrode material a carbonaceous material having a specified pseudographite structure and electron state. The present invention has been accomplished on the basis of the discovery.

The carbonaceous material in accordance with the present invention is obtained by the pyrolysis of an organic compound capable of forming the graphite structure. This carbonaceous material has such a pseudographite structure that the spacing of (002) planes, d002 is at least 3.37 Å and the crystallite size in the direction of c axis, Lc, is not more than 220 Å, as determined by X-ray wide-angle diffraction. The carbonaceous material has such an electron state that the line width $\Delta Hpp$ between peaks in the first differential of the absorption spectrum of electron spin resonance is at least 10 gauss.

DETAILED DESCRIPTION OF THE INVENTION

Figure 1:
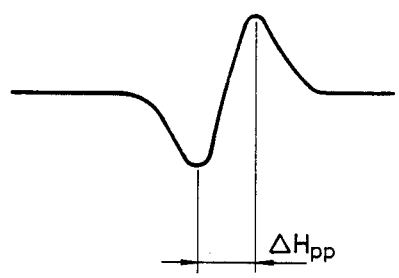
FIG. 1 is a sketch for the first differential of the absorption spectrum of electron spin resonance, together with the definition of an inter-peak line width $\Delta Hpp$.

The electrode material in accordance with the present invention has a pseudo-graphite structure obtained by the pyrolysis of an organic compound capable of forming the graphite structure.

The organic compound capable of forming the graphite structure as used in the present invention is such an organic compound that carbon-carbon bonds will change to a benzene ring structure upon reactions such as decomposition and condensation and that a continuous one- and two-dimensional bonding of such benzene rings forms a plurality of stacked polycyclic aromatic planes.

Examples of such organic compounds are listed below.

(A) Condensed polycyclic hydrocarbon compounds are polycyclic heterocyclic compounds Condensed polycyclic hydrocarbon compounds are such that at least two monocyclic hydrocarbon compounds consisting of a three- or more membered ring are condensed together. Derivatives of such condensed products may also be used.

Polycyclic heterocyclic compounds are such that at least two monocyclic heterocyclic compounds consisting of a three- or more membered ring are condensed together or at least one such monocyclic heterocyclic compound is condensed with at least one monocyclic hydrocarbon compound consisting of a three- or more membered ring. Derivatives of such condensed products may also be used.

Specific examples of the condensed polycyclic hydrocarbon compounds are naphthalene, chrysene, pyrene, perylene, naphthoanthrene, terylene, pyranthrene, dibenzo(b,h)-chrysene, coronene, benzo(a)coronene, pentacene, ovalene and dibenzoperopyrene, as well as derivatives thereof. Specific examples of the polycyclic heterocyclic compounds are isoquinoline, phenazine and phthalazine, as well as derivatives thereof.

Preferred compounds are selected from the following group.

1,2,4,5-substituted benzenes, naphthalene, isoquinoline, 1,4,5,8-substituted phthalazines, 1,4,9,10- or 1,5,9,10-substituted anthracenes, 1,6,7,12-substituted chrysenes, 1,5,6,10-substituted pyrenes, 3,4,9,10-substituted perylenes, 1,5,6,11- or 5,6,10,11-substituted naphthoanthrene, 3,4,11,12-substituted terylenes, 1,14,7,8-dibenzoperopyrenes, 1,8,9,16-substituted 1,14,7,8-dibenzoperopyrenes, 1,7,8,16-, 1,8,9,16- or 5,6,13,14-substituted pyranthrenes, 1,7,8,15-, 8,9,14,15-, 1,8,9,15- or 7,8,14,15-substituted dibenzo(b,h)chrysenes, 1,6,7,12-substituted coronenes, 4,5,12,13-substituted benzo(a)coronenes, dibenzo(a,l)pentacenes, 4,5,13,14-substituted dibenzo(a,l)pentacenes, 1,7,8,14-, 4,5,12,13- or 4,5,11,12-substituted ovalenes, quaterylene, 3,4,13,14-substituted quaterylenes, dibenzo(def,mno)chrysene, and 3,4,9,10-substituted dibenzo(def,mno)chrysenes.

Illustrative substituents are organic compounds such as carboxylic acids, carboxylic acid anhydrides and carboxylic acid imides that contain a hetero atom and easily undergo homolytic fission and wherein two groups are bonded together with

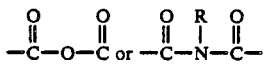

(R is hydrogen or an alkyl group, an aryl group or an alkoxy group, having 1 to 10 carbon atoms) to form a ring structure. In addition to compounds having a preformed cyclic structure, the compounds which form a ring structure during pyrolysis such as those having two carboxylic acids on adjacent carbon atoms may also be used.

Preferred compounds of group (A) are selected from the following group: benzene-1,2,4,5-tetracarboxylic acid, benzene-1,2,4,5-tetracarboxylic acid dianhydride, and benzene-1,2,4,5-tetracarboxylic acid diimide; naphthalene; isoquinoline; phthalazine-1,4,5,8-tetracarboxylic acid, phthalazine-1,4,5,8-tetracarboxylic acid dianhydride, and phthalazine-1,4,5,8-tetracarboxylic acid diimide; perylene; perylene-3,4,9,10-tetracarboxylic acid, perylene-3,4,9,10-tetracarboxylic acid dianhydride, and perylene-3,4,9,10-tetracarboxylic acid diimide; terylene; terylene-3,4,11,12-tetracarboxylic acid, terylene-3,4,11,12-tetracarboxylic acid dianhydride, and terylene-3,4,11,12-tetracarboxylic acid diimide; pyrene; pyrene-1,5,6,10-tetracarboxylic acid and pyrene-1,5,6,10-tetracarboxylic acid, and pyrene-1,5,6,10-tetracarboxylic acid diimide; dibenzo(def,mno)chrysene; dibenzo(def,mno)chrysene-3,4,9,10-tetracarboxylic acid, dibenzo(def,mno)chrysene-3,4,9,10-tetracarboxylic acid dianhydride, and dibenzo(def,mno)chrysene-3,4,9,10-tetracarboxylic acid diimide; coronene; and coronene-1,6,7,12-tetracarboxylic acid, coronene-1,6,7,12-tetracarboxylic acid dianhydride; and coronene-1,6,7,12-tetracarboxylic acid diimide.

These compounds may have their carbon skeleton substituted by a halogen and even such halogenated compounds may also be used.

(B) Linear novolak resins

Linear novolak resins may be prepared by polycondensation of aldehyde compounds with mono-substituted phenols having a substituent on the ortho- or para-position.

More-substituted phenols having a substituent on the ortho- or para-position are represented by the following formula (1) or (2):

or

wherein X represnts a substituent.

Examples of the substituent X are alkyl groups such as methyl and nonyl, or halogens such as chlorine.

Illustrative aldehyde compounds are formaldehyde, paraformaldehyde, trioxane, acetaldehyde, furfural and acrolein. Formaldehyde, paraformaldehyde and trioxane are particularly preferred.

The mono-substituted phenols and aldehyde compounds are polycondensed in the presence of an acidic catalyst selected from among mineral acids such as hydrochloric acid, nitric acid, sulfuric acid, phosphoric acid and perchloric acid, as well as from among organic acids such as p-toluenesulfonic acid and oxalic acid.

In order to prepare high-molecular weight linear novolak resins from the mono-substituted phenols and aldehyde compounds using the acidic catalyst, the proper process conditions must be selected depending upon the specific case.

The methods for obtaining high-molecular weight, linear novolak resins are known. For example, W. J. Burke et al. reported in *Journal of Polymer Science*, 20, 75–88 (1956) that a high-molecular weight novolak type p-chlorophenolic resin could be obtained by polycondensing p-chlorophenol with formaldehyde. Hideo Matsuzaki reported in *Kogyo Kagaku Zasshi* (J. Chem. Soc. Japan, Ind. Chem. Sec.), 66, 95–99 (1963) the polycondensation of phenol and paraformaldehyde in the presence of p-toluenesulfonic acid as a catalyst.

High-molecular weight ortho-cresol novolak resin and a process for producing the same are disclosed in Japanese Patent Application (OPI) No. 57-113. When an ortho-cresol novolak resin having a number average molecular weight of 550 is reacted with 37% formalin in toluene (solvent) in the presence of nitric acid at 175° C. under superatmospheric pressure, a linear high-molecular weight (number av. mol. wt.=2,010) ortho-cresol novolak resin that is soluble in dimethylacetamide is obtained.

A high-molecular weight ortho- and para-cresol copolymerized novolak resin and a process for producing the same are described in Unexamined Published Patent Application No. 56-92908. When an ortho-cresol novolak resin having a number average molecular weight of 550 is reacted with 2,6-dimethylol-p-cresol in ortho-dichlorobenzene (solvent) at 175° C. in the presence of nitric acid, a linear, high-molecular weight (number av. mol. wt.=1,930) ortho- and para-cresol copolymerized resin that is soluble in dimethylacetamide is obtained.

Preferred linear high-molecular weight ortho-cresol novolak resins or ortho- and para-cresol random copolymerized novolak resins may be prepared by the following novel process, in which ortho-cresol or a mixture of ortho-cresol and para-cresol is polymerized with formaldehyde, paraformaldehyde or trioxane in a polar organic solvent (i.e., alkyl alcohol or alkylcarboxylic acid) in the presence of an acid catalyst. In accordance with this method, novolak resins having fairly high molecular weights ranging from 2,100 to 5,000 in terms of the number average molecular weight are obtained.

The linear high-molecular weight novolak resins prepared by the methods described above generally have number average molecular weights of 1,000 or more as determined by VPO (vapor pressure osmometry), preferably, 1,200 or more, more preferably 1,500 or more, and most preferably 2,000 or more.

The term "linear high-molecular weight novolak resin" means those novolak resins which are soluble in either one of dimethylacetamide, tetrahydrofuran and dioxane and which are substantially free from a gel component. Therefore, even novolak resins that have a small content of branched or network structure may be employed so long as they satisfy the requirement for solubility in the solvents listed above.

In order to meet such requirements as the need to provide a shaped product having a certain amount of physical strength, the linear high-molecular weight novolak resin used in the present invention preferably contains a curing agent which helps its curing to varying degrees before it is pyrolyzed to form a polymeric conjugate. Suitable agents that may be used for the purpose of curing the linear high-molecular weight novolak resins include aldehyde compounds such as formaldehyde, paraformaldehyde, acetaldehyde and furfural, and other known cross-linking agents such as hexamethylene tetramine and trimethylol phosphine oxide.

The linear high-molecular weight novolak resins may be cured by reaction with resol that is obtained by reacting phenol with an aldehyde compound in the presence of an alkali catalyst.

Other usable curing agents are compounds having an epoxy group, such as epoxy resins.

The amount of curing agent used varies with its type. If aldehyde compounds or epoxy compounds are used as the curing agent, their amounts are selected from the range up to 2.5 moles of the aldehyde compound or epoxy group per mole of the phenolic OH group in the linear high-molecular weight novolak resin. If hexamethylenetetramine or resol is used as the curing agent, their amounts are selected from the range up to 60 weight % of the linear high-molecular weight novolak resin.

Curing accelerators such as benzyldimethylamine, imidazoles, tris-dimethylaminomethyl phenol and BF₃-piperidine salts, as well as a variety of fillers may optionally be used together with the curing agents.

(C) Poly(haloacrylonitrile), poly(halodicyanoethylene) and poly(cyanoacetylene)

Examples of the poly(haloacrylonitrile) are poly(α-haloacrylnitrile) and poly(β-haloacrylnitrile), which are respectively prepared by polymerizing α-haloacrylonitrile and β-haloacrylnitrile. Homopolymers are useful but copolymers containing small proportions of comonomers may be used. Suitable comonomers include those which contain a nitrile group such as acrylonitrile, and vinyl halide compounds such as vinyl fluoride. The α-haloacrylonitrile and β-haloacrylonitrile are monomers that are respectively represented by the following formulae (3) and (4):

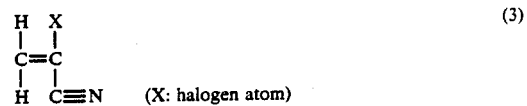

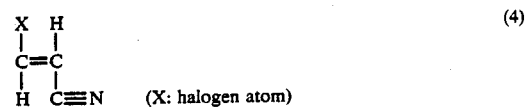

The poly(α-haloacrylonitrile) and poly(β-halocrylonitrile) are usually obtained by radical polymerization of α-haloacrylonitrile and β-haloacrylonitrile, respectively. A copolymer of α-haloacrylonitrile and β-haloacrylonitrile may also be used in the present invention.

The poly(halodicyanoethylene) is obtained by polymerizing a halocyanoethylene and includes a homopolymer of halodicyanoethylene, as well as a copolymer of halodicyanoethylene and a small amount of a comonomer. The halodicyanoethylene is a monomer represented by formula (5):

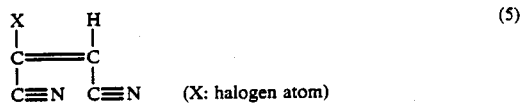

The poly(cyanoacetylene) and poly(dicyanoacetylene) are polymers of cyanoacetylene and dicyanoacetylene which are respectively represented by formulae (6) and (7). Homopolymers are preferred but copolymers with small fractions of comonomers may be used.

H—C≡C—C≡N        (6)

N≡C—C≡C—C≡N     (7)

The electrode material is obtained by the pyrolysis of one or more polymers selected from among the above-mentioned poly(α-haloacrylonitrile), poly(β-haloacrylonitrile), poly(halodicyanoethylene), poly(cyanoacetylene) and poly(dicyanoacetylene).

In a preferred embodiment, the poly(α-haloacrylonitrile), poly(β-haloacrylonitrile) and poly(halodicyanoethylene) may be pyrolyzed after they are subjected to the reaction of removal of hydrogen halide by treatment with a tertiary amine compound such as pyridine, DBU (1,8-diazabicyclo[4,3,0]undecene-7) or triethylamine, a phase transfer catalyst such as benzenetrimethyl ammonium hydroxide, sodium amide (used in liquid ammonia), alkali hydroxide (used at high temperatures and pressure), potassium butoxide, butyl lithium, the combination of an aqueous alkali solution and an amine compound, and a crown ether.

(D) Polyphenylene and poly(substituted phenylene)

Poly(phenylene) and poly(substituted phenylene) may be synthesized by several known methods. See, for example, "*A Course in the Theory of Polymerization Reactions*", 12, New Polymerization Reactions, ed. by T. Saegusa, p. 31, ff.

Usually, these polymers are obtained by subjecting benzene or a substituted benzene to oxidative cationic polymerization in the presence of a Lewis acid-oxidant system such as $AlCl_3$-$CuCl_2$.

A preferred method for the synthesis of a high-molecular weight polyparaphenylene is disclosed by Marvel et al. in *J. American Chemical Society*, 81, 448 ff. (1959). This method consists of polymerizing 1,3-cyclohexadiene in the presence of a Ziegler catalyst such as $Ti(OC_4H_9)_4$-$Al(i-C_4H_9)_3$ or a cationic catalyst such as $BF_3$, followed by treatment with a dehydrogenating agent such as chloranil to make the desired poly(paraphenylene).

The poly(phenylene) and poly(substituted phenylene) used in the present invention have an average degree of polymerization (n) of at least 5, preferably at least 7, more preferably at least 10. However, poly(phenylene) having excessively high molecular weights are neither soluble or meltable and defy exact measurement of its molecular weight. The poly(phenylene) and poly(substituted phenylene) that are insoluble in solvents and which hence defy exact measurement of their molecular weights will be regarded as having degrees of polymerization of 7 or more.

Preferred poly(phenylene) is poly(paraphenylene) since a product with an adequately high molecular weight can be obtained fairly easily and at low cost.

The organic compounds capable of forming the graphite structure are pyrolyzed either in vacuum or under an inert gas (e.g., nitrogen or argon) stream or an oxidizing gas (e.g., air) stream or a mixture of such streams. Usually, the organic compounds are pyrolyzed in vacuum or under an inert gas stream.

The mechanism of the pyrolysis is hereunder described with reference to naphthalene-1,4,5,8-tetracarboxylic acid dianhydride of group (A):

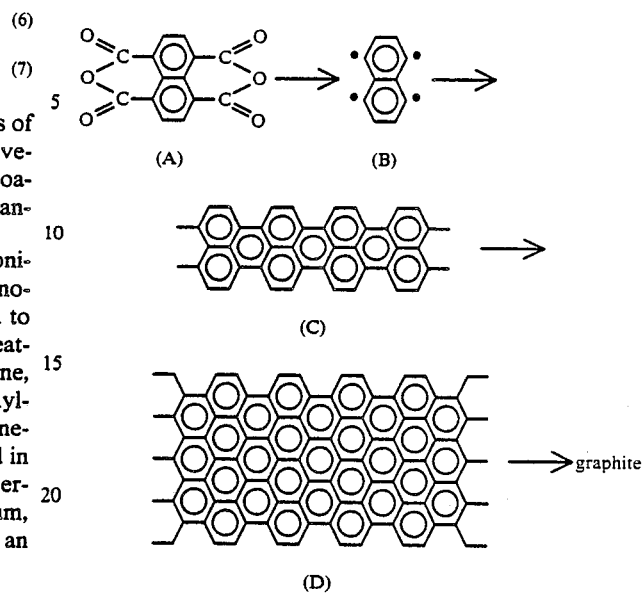

When (A) is heated with a thermal energy greater than the dissociation energy necessary to break the bond between the skeletal carbon and an adjacent hydrogen atom or a substituent, carbon radicals (B) are formed predominantly by homolytic cleavage. A chain of carbon radicals is cyclized to provide a higher molecular weight and the process of graphitization occurs that is characterized by the development of polycyclic aromatic planes. In the initial stage of graphitization, benzene rings are bound together one-dimensionally to form a one-dimensional graphite structure (C). Subsequently, the benzene rings start to bind with one another two-dimensionally, and gradually expanding polycyclic aromatic planes begin to stack in layers to form a two-dimensional graphite structure (D).

The same phenomenon will occur in the pyrolysis of other organic compounds capable of forming the graphite structure; the one-dimensional graphite structure (C) forms as a result of thermal decomposition or condensation, and subsequently a structure similar to the two-dimensional graphite structure (D) forms.

With further progress of carbonization, more benzene rings are bound two-dimensionally and adequately expanded polycyclic aromatic planes stack one on another in an orderly manner to form the ordinary graphite. In accordance with the present invention, all structures that lead to the final graphite are collectively referred to as the pseudo-graphite structure. The organic compounds capable of forming the graphite structure may be carbonized not only by application of thermal energy but also by irradiation by light energy greater than the dissociation energy, as well as by irradiation by accelerated charged particles such as $Br^+$ or $Ar^+$ or by plasma irradiation. The graphitization reaction of the organic compounds may proceed in any one of the three states, molten, solid and gaseous. The carbonaceous material thus obtained in accordance with the present invention is very stable and will not deteriorate upon standing in air at room temperature.

The pseudo-graphite structure in accordance with the present invention can be determined both qualitatively and quantitatively by X-ray wide angle diffraction. The ordinary graphite shows a sharp diffraction peak corresponding to a (002) plane at about $2\theta=26°$. In the initial stage of graphitization of the organic compounds capable of forming the graphite structure, no diffraction peak corresponding to the (002) plane appears. The one-dimensional graphite obtained by further pyrolysis has a very broad diffraction peak corresponding to the (002) plane and its intensity is low. As two-dimensional polycyclic aromatic planes begin to stack one after another, the diffraction peak corresponding to the (002) plane gradually becomes sharp and its intensity increases. The pseudo-graphite structure which characterizes the carbonaceous material of the present invention is such that the spacing of (002) planes, d002, is at least 3.37 Å and the crystallite size in the direction of c axis, Lc, is not more than 220 Å. Preferably, d002 is at least 3.40 Å and not more than 3.75 Å, whereas Lc is at least 7.0 Å and not more than 150 Å. More preferably d002 is at least 3.41 Å and not more than 3.70 Å whereas Lc is at least 7.0 Å and not more than 70 Å.

The pseudo-graphite structure in accordance with the present invention is also determined quantitatively by X-ray wide-angle diffraction such that the distance $a_0 (=2d110)$ twice the spacing of (110) planes, d110, is preferably at least 2.37 Å and not more than 2.47 Å, more preferably at least 2.37 Å and not more than 2.46 Å. In the preferred pseudo-graphite structure, the crystallite size in the direction of a axis, La, is not more than 200 Å. More preferably, La is at least 7.0 Å and not more than 150 Å, with the range of 10 to 80 Å being particularly preferred.

Figure 2:
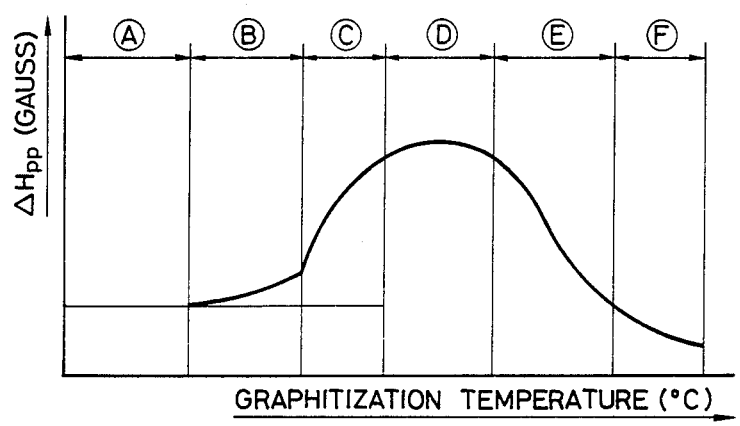
FIG. 2 shows the concept of the behavior of the inter-peak line width $\Delta Hpp$ that is divided into six regions, A, B, C, D, E and F as a function of the graphitization temperature.

The electron state of the carbonaceous material in accordance with the present invention is determined quantitatively by electron spin resonance spectroscopy. More specifically, the line width ($\Delta Hpp$ in gauss) between peaks in the first differential of the absorption spectrum of electron spin resonance as shown in FIG. 1 is used as the factor for determining the electron state of the carbonaceous material. FIG. 2 shows the concept of the behavior of $\Delta Hpp$ as a function of the carbonization temperature for the condensed polycyclic hydrocarbon compound and polycyclic heterocyclic compound used as the organic compound capable of forming the graphite structure. According to the finding of the present inventors, the behavior of $\Delta Hpp$ can be divided into six regions, A to F. Region A corresponds to the initial stage of carbonization and the value of $\Delta Hpp$ is smaller than 7 (indicating a very sharp peak in the spectrum) and either remains constant or decreases slightly with the increasing temperature. In region B, $\Delta Hpp$ increases gradually and is in the range of $7 \leq \Delta Hpp \leq 10$. Region B may contain an extension of region A having a sharp peak ($\Delta Hpp<7$), as indicated by the dashed line. In region C, $\Delta Hpp$ increases rapidly and is in the range of $10<\Delta Hpp \leq 1000$. Region C may also contain an extension of region A having a sharp peak ($\Delta Hpp<7$), as indicated by the dashed line. In region D, a hyperbroad peak exists in the spectrum and $\Delta Hpp>1000$. In some cases, it is apparently impossible to detect the absorption spectrum in region D. The exact reason for this is not clear but the existence of a hyperbroad peak would be the primary cause. In region E, $\Delta Hpp$ decreases and is in the range of $7 \leq \Delta Hpp \leq 1000$. In region F, a sharp peak appears again and $\Delta Hpp$ is smaller than 7. The horizontal axis of the graph in FIG. 2 indicates the graphitization temperature, but it should be understood that given the same graphitization temperature, $\Delta Hpp$ may vary and belong to different regions depending upon other conditions for graphitization such as the rate of temperature increase and the period for which said graphitization temperature is retained. In an extreme case, there may exist no distinct separation between each region. It is not clear what the electron states ranging from regions A to F mean in physical terms. Most probably, the peaks in regions A and B may be explained by unpaired electrons that exist stably in the long conjugated chain. Conduction electrons would be responsible for the peaks in regions C, D, E and F. Conduction electrons may make some contribution to the peak in region B. For the purpose of the present invention, the electron states in regions C, D and E having $\Delta Hpp$ not smaller than 10 gauss are necessary. Electron states having $\Delta Hpp$ of at least 12 gauss are preferred, with $\Delta Hpp$ of at least 15 gauss being particularly preferred.

When organic polymeric compounds such as poly($\alpha$-haloacrylonitrile) or the reaction product of a linear high-molecular weight novolak resin and a curing agent are used as the organic compounds capable of forming the graphite structure, the behavior of their values of $\Delta Hpp$ as a function of the graphitization temperature is not necessarily the same as shown in FIG. 2. But even in this case, the line width, $\Delta Hpp$, between peaks in the first differntial of the absorption spectrum of electron spin resonance must be at least 10 gauss.

Some carbonaceous materials prepared in accordance with the present invention may exhibit two or more signals in the first differential of the absorption spectrum of electron spin resonance, and even such materials are included within the scope of the present invention if at least one of the signals have an interpeak line width, $\Delta Hpp$, of 10 gauss or more.

Carbonaceous materials may also be obtained that have no clearly distinguishable signals in the first differential of the absorption spectrum electron spin resonance; such materials are also included within the scope of the present invention if there exists no signal having an interpeak line width, $\Delta Hpp$, of less than 10.

The pyrolysis temperature relates to the degree of growth of the intended polymer conjugate. In order to achieve a balance between the ease of doping electrolyte ions, the stability of doped charges and the electrical conductivity of undoped polymer conjugate, the proper pyrolysis temperature is selected preferably from the range of 300° to 3,000° C., more preferably from the range of 400° to 2,500° C.

The pyrolysis period is generally at least 5 minutes and the preferred range is from 10 minutes to 20 hours. The range of 20 minutes to 10 hours is particularly preferred.

By providing a larger specific surface area for the electrode material formed, a battery capable of producing a higher maximum power density can be obtained. Therefore, in order to ensure a high maximum power density, the shaped article of the electrode material formed or a shaped article containing such electrode material preferably has a specific surface area of at least 10 m$^2$/g, more preferably at least 50 m$^2$/g, and most preferably at least 100 m$^2$/g. This object can be attained by pyrolyzing the organic compound either under an oxidizing gas (water vapor, or $CO_2$) stream or under a stream of a mixture of such oxidizing gas and an inert gas. Another effective way is to perform a preliminary pyrolysis under an inert gas stream, followed by another pyrolyzing step under an oxidizing gas stream or under a stream of a mixture of an oxidizing gas and an inert gas.

A larger specific surface area may also be obtained by pyrolyzing a porous shaped article of the reaction product of the linear high-molecular weight novolak resin and the curing agent.

The organic compound to be pyrolyzed is shaped to a variety of forms such as fibers, powders, granules, films, sheets and felt. Polymer conjugates prepared by pyrolyzing films, sheets or felt of the organic compound such as the reaction product of the linear high-molecular weight novolak resin and curing agent may be immediately used as cell electrodes.

Electrode materials in a fibrous, powder or granular form may be used as cell electrodes after they are shaped into the form of paper sheet or film by any of the known techniques.

The carbonaceous material obtained by pyrolyzing the organic compound may be independently used as the electrode material of the present invention. If desired, such carbonaceous material may be supplemented with or supported on, a conductive material (e.g., carbon fibers), an insulating material or a reinforcing material. In this latter case, the amount of the electrode material in the shaped article is not limited to any particular value, but preferably, the electrode material is present in an amount of at least 50 wt%, with the range of 70 wt% and upward being particularly preferred.

A variety of carbonaceous materials, metallic materials and conductive ceramics may be used as the conductive additives. Suitable insulating materials include ceramics such as $Al_2O_3$ and $SiO_2$, and glassy materials such as borosilicate glass and silicate glass.

The organic compound in accordance with the present invention may be supported on the conductive additive, insulating material or reinforcing materials by various methods. First, the organic compound is supported on the carrier by a suitable technique and the compound on the carrier is carbonized by heating. Suitable presupporting techniques include gasification at temperatures not higher than the thermal decomposition point of the compound, solubilization in a solvent and dispersion in the same. Secondly, the compound is first gasified by either evaporation or sublimation and then deposited on the carrier as graphitization proceeds. Thirdly, a molten compound is brought into contact with, or impregnated in, the carrier and then, is graphitized to make the compound on the carrier.

The proportion of the carbonaceous material carried is not limited to any particular value, but the preferred range is from 0.1 to 99 wt%. The range of 1 to 97 wt% is particularly preferred.

The electrode material of the present invention may be used as either positive or negative electrode or both. The electrode material is submerged in an electrolyte to make a primary or secondary battery. Any of the known electrolytes may be used and they include tetraalkylammonium salts (counter anions are perchlorate ion, phosphorus hexafluoride ion, thallium hexafluoride ion, arsenic hexafluoride ion, antimony hexafluoride ion, halide ions, nitrate ion, sulfate ion and rhenium tetraoxide ion), alkali metal salts, alkaline earth metal salts (counter ions are the same as listed above), as well as halides, perchlorates and nitrates of transition metals, rare earth elements and noble metals. Any of the solvents that are commonly used in conventional batteries may be used, and they include water, dimethyl sulfoxide, acetonitrile, propylene carbonate, 4-butyrolactone, formamide, tetrahydrofuran and 1,2-dimethoxyethane. The batteries fabricated by using the electrode material of the present invention as shown above are stable, produce high electromotive force, have high maximum power and energy densities, can be used with a variety of electrode shapes.

The carbonaceous material in accordance with the present invention finds many other uses as electrical and electronic materials in solar cells, sensors, capacitors and conductors.

The various parameters that characterize the carbonaceous material of the present invention are determined by the following respective methods.

(1) d002, the spacing of (002) planes, and d110, the spacing of (110) planes:

A powder of carbonaceous material (flaky carbonaceous material is reduced to a powder in an agate mortar) is packed into a sample cell together with ca. 15 wt% of the powder of an internal standard substance, a high-purity silicon powder of the standard grade for X-ray analysis. A wide-angle X-ray reflection diffractometer scan is obtained with monochromatic $CuK\alpha$ radiation from a graphite monochrometer. Instead of making corrections associated with the Lorentz factor, polarization factor, absorption factor and atomic scattering factor, the following simple and convenient method is used. Draw a baseline for the scan curves corresponding to diffractions at (002) and (110) planes. Plot the substantial intensities as calculated from the baseline, obtaining corrected curves for (002) and (110) planes. Draw an angular axis at a height which is two-thirds of the height of the peak in each curve and obtain the midpoint of the line defined by the two points where a line parallel to that angular axis intersects the scan curve. Correct the angle of the midpoint by the internal standard to obtain a value twice the angle of diffraction. Substitute this value and the wavelength of $CuK\alpha$ radiation, $\lambda$, into the following two equations of Bragg's law:

$$d002 = \frac{\lambda}{2\sin\theta} \text{ Å}$$

$$d110 = \frac{\lambda}{2\sin\theta} \text{ Å}$$

wherein:
$\lambda$: 1.5418 A
$\theta$: the angle of diffraction corresponding to d002 or d110.

(2) Crystallite size in c and a axes, Lc and La:

Obtain the half-width $\beta$ at a point half the height of the peak in each of the corrected scan curves prepared in (1), and substitute this value into the following equations:

$$Lc = \frac{K \cdot \lambda}{\beta\cos\theta} \text{ Å}$$

$$La = \frac{K \cdot \lambda}{\beta\cos\theta} \text{ Å}$$

Various values may be taken for the shape factor K, but in the present invention, 0.90 is used. For the meanings of $\lambda$ and $\theta$, see (1).

(3) Line width between peaks in the first differential of the absorption spectrum of electron spin resonance, $\Delta Hpp$:

The first differential of the absorption spectrum of electron spin resonance was measured with JEOL JES-FE 1X ESR spectrometer in the X-band. A powder of carbonaceous material (flaky carbonaceous material is reduced to a powder in an agate mortar) is put into a capillary tube (ID: 1 mm) which is placed in an ESR tube (OD: 5 mm). The radiofrequency magnetic field is modulated by an amount of 6.3 gauss. All the procedures above are followed within air at 23° C. The value of $\Delta Hpp$ is determined by comparison to a standard sample, $Mn^{2+}/MgO$.

(4) Elemental analysis:

A sample is dried in vacuum at 120° C. for ca. 15 hours. Then, the sample is transferred onto a hot plate in a dry box and dried in vacuum at 100° C. for 1 hour. A portion of the dried sample is put into an aluminum cup in an argon atmosphere, and the carbon content is determined from the weight of $CO_2$ gas evolved as a result of combustion whereas the hydrogen content is determined from the weight of $H_2O$ also evolved by combustion. In the Examples that follow, an elemental analyzer of Perkin-Elmer Model 240 C was used.

The following Examples and Comparative Examples are provided for further illustration of the claimed electrode material and should not be construed as limiting.

EXAMPLE 1-1

A powder of naphthalene-1,4,5,8-tetracarboxylic acid dianhydride was put in a magnetic crucible and preliminarily graphitized by heating at one atmosphere in $N_2$ gas stream under the following conditions: the temperature was elevated to $T_R = 375°$ C. at a rate of $Vt = 10°$ C./min. and that temperature was retained for $Ht = 30$ minutes.

Figure 3:
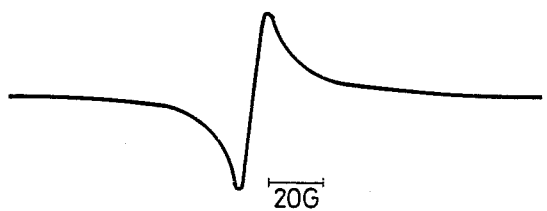
FIGS. 3 to 7 are the first differential of the absorption spectra of electron spin resonance that were obtained for the carbonaceous materials prepared in several of the Examples and Comparative Examples that are given later in this specification.

The powder was cooled to room temperature and again heated in $N_2$ stream to $T_R = 460°$ C. at a rate $Vt = 10°$ C./min., followed by holding for $Ht = 30$ minutes. The first differential of the absorption spectrum of electron spin resonance for the resulting flaky carbonaceous material is shown in FIG. 3, from which one can see that $\Delta Hpp = 11.2$ gauss. The intensity of a diffraction curve for the same material was weak; $d002 = 3.67$ Å and $Lc = 13.0$ Å. A portion (1.8 mg) of the carbonaceous material was wrapped with a platinum screen to make a positive electrode. This positive electrode and a metallic lithium negative electrode were submerged in an electrolyte (1.0M solution of lithium perchlorate in propylene carbonate) to make a battery.

The battery was charged at 59 μA (5 μA/mg) for 333 minutes until 1.180 coulombs of electric charge (0.1 C/mg) was stored. The charged battery had an open circuit voltage Voc of 4.54 volts and was capable of producing high electromotive force. After charging, the battery was left to stand in the open circuit state; the self-discharge at 10th hour was 3.5%, indicating high stability of the battery.

EXAMPLE 1-2

A powder of the same material as used in Example 1-1 was preliminarily graphitized by heating in $N_2$ stream under the following conditions: $Vt = 10°$ C./min., $T_R = 375°$ C. and $Ht = 30$ min. The powder was cooled to room temperature and graphitized under the following conditions: $Vt = 10°$ C./min., $T_R = 570°$ C. and $Ht = 30$ min. A flaky carbonaceous material was obtained; $\Delta Hpp = 110.4$ gauss. The intensity of a diffraction curve for this material was weak: $d002 = 3.67$ Å and $Lc = 13.1$ Å. A battery was fabricated as in Example 1-1 using 16.9 mg of this carbonaceous material as a positive electrode. The battery was charged for 333 minutes at 84 μA (5 μA/mg) until the charge stored was 1.690 C (0.1 C/mg). The charged battery had Voc of 4.50 volts and was capable of producing high electromotive force. After charging, the battery was left to stand in the open circuit state; the self-discharge at 10th hour was 4.6%, indicating high stability of the battery.

EXAMPLE 1-3

A fiberglass filter (GA 200 of Toyo Roshi Kaisha Ltd.) was used as a carrier. A powder (ca. 100 mg) of the same material as used in Example 1-1 was put in a magnetic crucible and a rectangle of the fiberglass filter (26.6 mg) was buried in the powder. The powder was preliminarily graphitized by heating in $N_2$ stream under the following conditions: $Vt = 10°$ C./min., $T_R = 375°$ C. and $Ht = 30$ minutes. The powder was deposited onto the fiberglass filter by sublimation. The powder was cooled to room temperature and graphitized by another heating in $N_2$ stream under the following conditions: $Vt = 10°$ C./min., $T_R = 520°$ C. and $Ht = 30$ min. As a result of carrying the carbonaceous material, the fiberglass filter increased in weight to 31.8 mg. The carbonaceous material was uniformly carried on the filter in a proportion of 16.4%. The carried carbonaceous material had $\Delta Hpp = 11.7$ gauss. The intensity of a diffraction curve for this material was weak; $d002 = 3.62$ Å and $Lc = 13.2$ Å. The respective values of $\Delta Hpp$, $d002$ and Lc were determined using a pure carbonaceous material obtained by graphitization in magnetic crucible under the same conditions as used above. A battery was fabricated as in Example 1-1 using 31.8 mg of the fiberglass filter (corresponding to 5.2 mg of the pure carbonaceous material) as a positive electrode. The battery was charged for 250 minutes at 104 μA (20 μA/mg) until the charge stored was 1.645 C (0.32 C/mg). The charged battery had Voc of 4.88 volts and was capable of producing high electromotive force. The charged battery had a high theoretical energy density, 370 W.h/kg.

COMPARATIVE EXAMPLE 1-1

Figure 4:
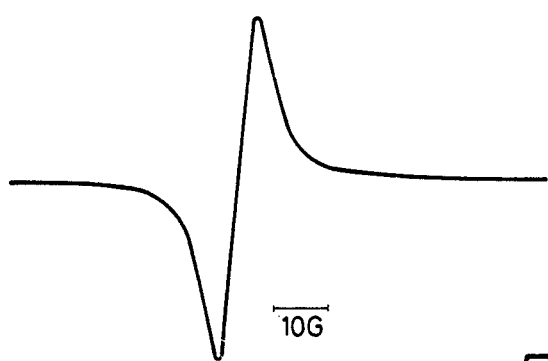

A powder of the same material as used in Example 1-1 was graphitized by heating in $N_2$ stream under the following conditions: $Vt = 10°$ C./min., $T_R = 375°$ C. and $Ht = 30$ min. A first differential of the absorption spectrum of electron spin resonance for the resulting powder of carbonaceous material is shown in FIG. 4, from which one can see that $\Delta Hpp = 6.7$ gauss. A battery was fabricated as in Example 1-1 using 23.7 mg of the carbonaceous material as a positive electrode. This battery was charged for 333 minutes at 118 μA (5 μA/mg) until the charge stored was 2.370 C (0.1 C/mg). With the progress of charging, the potential increased rapidly to give Voc which was as high as 5.38 volts, but when the charging was completed, a momentary voltage drop occurred. Additionally, the electrolyte turned yellow as the charging proceeded. Because of these problems, i.e., high overvoltage and decomposition of the electrolyte, the carbonaceous material prepared in Comparative Example 1-1 was not suitable for as an active material for battery electrodes.

EXAMPLE 2-1

Figure 5:
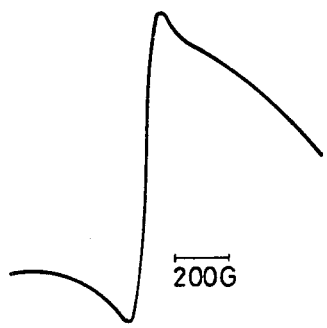

A powder of perylene-3,4,9,10-tetracarboxylic acid dianhydride was graphitized by heating in $N_2$ stream under the following conditions: $Vt = 10°$ C./min., $T_R = 570°$ C. and $Ht = 60$ min. The first differential of the absorption spectrum of electron spin resonance for the resulting powder of carbonaceous material is shown in FIG. 5, from which one can see that $\Delta Hpp = 105.1$ gauss. The intensity of a diffraction curve for the same material was weak; $d002 = 3.61$ Å and $Lc = 13.3$ Å. Two portions (7.4 mg each) of the carbonaceous material was individually wrapped with a platinum screen to make positive and negative electrodes, which were separated by a fiberglass filter. The outer surfaces of the electrodes were also covered with a fiberglass filter, which was fixed by wrapping Teflon tape partly around the electrodes.

A battery was fabricated by submerging both electrodes in an electrolyte which was composed of a 1.0M solution of lithium perchlorate in propylene carbonate. This battery was charged for 667 minutes at 37 $\mu$A (5 $\mu$A/mg) until the charge stored was 1.480 C (0.2 C/mg). The charged battery had $Voc = 3.25$ volts and was capable of producing high electromotive force. Immediately after completion of the charging, the battery was shorted to produce a short circuit current Isc of 294 mA. The maximum power density Pmax was 14.5 kW per kg of the sum of the weight of the active material for both electrodes and that of doped ions.

COMPARATIVE EXAMPLE 2-1

A powder of the same material as used in Example 2-1 was graphitized by heating in $N_2$ stream under the following conditions: $Vt = 10°$ C./min., $T_R = 530°$ C. and $Ht = 60$ min. The resulting carbonaceous material had Hpp of 5.7 gauss. A battery was fabricated as in Example 2-1 by using two portions (10.0 mg each) of the carbonaceous material as positive and negative electrodes. The battery was charged for 667 minutes at 50 $\mu$A (5 $\mu$A/mg) until the charge stored was 2.000 C (0.2 C/mg). The potential between the electrodes increased rapidly when a charge of about 1.26 C had been stored. Because of this excessively high overvoltage, the carbonaceous material prepared in Comparative Example 2-1 was unsuitable for use as an active material for battery electrodes.

EXAMPLE 2-2

Figure 6:

A powder of the same material as used in Example 2-1 was graphitized by heating in $N_2$ stream under the following conditions: $Vt = 10°$ C./min., $T_R = 920°$ C. and $Ht = 60$ min. The first differential of the absorption spectrum of electron spin resonance for the resulting powder of carbonaceous material is shown in FIG. 6, from which one can see that $\Delta Hpp = 1294$ gauss. The intensity of a diffraction curve for the carbonaceous material was weak; $d002 = 3.62$ Å and $Lc = 13.8$ Å. A battery was fabricated as in Example 2-1 by using two portions (10.2 mg each) of the carbonaceous material as positive and negative electrodes. The battery was charged for 667 minutes at 51 $\mu$A (5 $\mu$A/mg) until the charge stored was 2.040 C (0.2 C/mg). The charged battery had $Voc = 3.60$ volts and was capable of producing high electromotive force. The short circuit current Isc of the battery was 298 mA and the maximum powder density Pmax was as high as 11.7 kW/kg.

EXAMPLE 2-3

Figure 7:
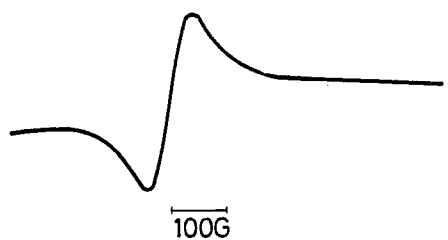

A powder of the same material as used in Example 2-1 was preliminarily graphitized by heating in $N_2$ stream under the following conditions: $Vt = 10°$ C./min., $T_R = 920°$ C. and $Ht = 60$ min. The powder was cooled to room temperature and graphitized by rapid heating in Ar stream to $T_R = 1,600°$ C. at which temperature the powder was held for $Ht = 60$ min. The first differential of the absorption spectrum of electron spin resonance for the resulting powder of carbonaceous material is shown in FIG. 7, from which one can see that $Hpp = 81.9$ gauss. An X-ray diffractiometry gave $d002 = 3.47$ Å and $Lc = 50.0$ Å. A battery was fabricated as in Example 2-1 by using two portions (13.4 mg each) of the carbonaceous material as positive and negative electrodes. The battery was charged for 667 minutes at 67 $\mu$A (5 $\mu$A/mg) until the charge stored was 2.680 C (0.2 C/mg). The charged battery had $Voc = 3.80$ volts and was capable of producing high electromotive force. The battery had $Isc = 380$ mA and $Pmax = 12.1$ kW/kg.

EXAMPLE 3

(1) Synthesis of linear high-molecular weight novolak resin

Ortho-cresol (108 g), para-formaldehyde (32 g), ethyl cellosolve (240 g) and sulfuric acid (10 g) were put into a reactor and agitated at 115° C. for 4 hours. After completion of the reaction, the mixture was neutralized with 17 g of $NaHCO_3$ and 30 g of water. The mixture was then charged into 2,000 ml of rapidly agitated water. The precipitating resin component was separated by filtration and dried to obtain 115 g of a resin. This resin was soluble in methanol, ethanol, butanol, octanol, methyl cellosolve, ethyl cellosolve, tetrahydrofuran, dioxane, acetone, methyl ethyl ketone and ethyl acetate, and had no gel component. The resin was insoluble in benzene, toluene, xylene, chloroform and carbon tetrachloride. The resin had a number average molecular weight of 2,600 as measured by VPO (at 40° C. in methyl ethyl ketone), and a softening point of 155° C. as determined by microscopic observation. IR and NMR analyses showed that this resin was a linear novolak resin consisting of cresol chains bound by methylene groups.

(2) Reaction with curing agent

A mixture of the linear high-molecular weight novolak resin (2.25 g) and hexamine (0.25 g) was dissolved in ethanol, which was then distilled off. The residual mixture of novolak resin and hexamine was put into a glass container and heated in nitrogen gas at 220° C. for 3 hours. The heat-treated mixture of novolak resin and hexamine swelled, rather than dissolved, in ethanol. The swollen novolak resin/hexamine mixture was compressed at 190° C. and 200 kg/cm$^2$ to make a strip 2 cm wide, 5 cm long and 1 mm thick.

(3) Pyrolysis

The strip was set in an electric furnace and heated in a nitrogen stream to 1,200° C. at a rate of 20° C./min. Thereafter, the strip was held at 1,200° C. for 1 hour in a nitrogen stream, producing a black strip of carbonaceous material weighing 50 mg.

Elemental analysis showed that this carbonaceous material had a H/C atomic ratio of 0.14. X-ray wide-angle diffractiometry gave the following data: $d002 = 3.80$ Å, $Lc = 11$ Å, $a_0 (2d110) = 2.38$ Å and $La = 16$ Å.

The line width ($\Delta Hpp$) between peaks in the first differential of the absorption spectrum of electron spin resonance was 50 gauss.

(4) Battery using the electrode material prepared in (3)

Fifty milligrams of the strip of carbonaceous material prepared in (3) was wrapped with a nickel screen (55 mesh) to make one electrode. Metallic lithium was also wrapped with a nickel screen (55 mesh) to make the other electrode. The two electrodes as separated by a fiberglass filter 0.5 mm thick were submerged in an electrolyte made of 1.0 mol/1,000 ml of $LiClO_4$ in propylene carbonate. The two electrodes were interconnected by a nickel wire lead. The resulting battery was charged by passing a constant 0.12 mA current from a potentiostat/galvanostat (HA-501 of Hokuto Denko K.K.), with the negative electrode connected to the electrode made of metallic lithium wrapped with the nickel screen and the positive electrode connected to the electrode composed of the strip of carbonaceous material also wrapped with the nickel screen. The charging was continued until a coulometer read a value of 6.0 C.

Battery's performance

Immediately after the charging, the battery was discharged with a constant 50 kΩ resistance connected between the electrodes, until the open circuit voltage between each electrode dropped to 2.5 volts. The quantity of discharge electricity was 5.2 C. The same constant resistance test was conducted after leaving charged the battery for 3 days. When the battery was discharged until the open circuit voltage became 2.5 volts, the 4.2 C of electricity was found to have been discharged.

EXAMPLE 4

A pressed strip of a heat-treated mixture of linear high-molecular weight novolak resin and hexamine was prepared as in Example 3. This strip was set in an electric furnace and heated in a nitrogen stream to 2,000° C. at a rate of 20° C./min. Thereafter, the strip was held at 2,000° C. for 1 hour in a nitrogen stream, producing a black strip of carbonaceous material weighing 50 mg.

Elemental analysis showed that this carbonaceous material had a H/C atomic ratio of 0.04. X-ray wide-angle diffractiometry gave the following data: $d002=3.61$ Å, $Lc=14$ Å, $a_0 (2d110)=241$ Å and $La=22$ Å.

The line width (ΔHpp) between peaks in the first differential of the absorption spectrum of electron spin resonance was 200 gauss.

Battery using the electrode material thus prepared

A battery was fabricated as in Example 3 except that metallic lithium was replaced by 50 mg of the strip of carbonaceous material that was wrapped with a nickel screen (55 mesh). The so fabricated battery was charged as in Example 3 by passing a constant 0.12 mA current between the two electrodes until a coulometer read a value of 6.0 C.

Battery's performance

Immediately after the charging, the battery was discharged with a constant 50 kΩ resistance connected between the electrodes, until the open circuit voltage between each electrode dropped to 1.0 volts. The quantity of discharged electricity was 5.3 C. The same constant resistance test was conducted after leaving the charged battery for 3 days. When the battery was discharged until the open circuit voltage became 1.0 volts, the 4.0 C of electricity was found to have been discharged.

COMPARATIVE EXAMPLE 3

Phenol was reacted with formaldehyde (molar ratio of formaldehyde to phenol: 0.82) in the presence of an acid catalyst to form a novolak resin having a number average molecular weight of 600. A mixture of the novolak resin (2.25 g) and hexamine (0.25 g) was dissolved in ethanol, and the resulting solution was cast onto a glass plate. The web was dried with air to remove ethanol, and then cured at 120° C. The cured sheeting (1 mm thick) was heated in a nitrogen stream to 500° C. at a rate of 5° C./min. and held at 500° C. for 1 hour, producing a sheet of carbonaceous material (50 mg).

X-ray wide-angle diffractiometry of the carbonaceous material gave a very broad peak corresponding to a (002) plane. The line width (ΔHpp) between peaks in the first differential of the absorption spectrum of electron spin resonance was 5 gauss.

Battery using the electrode material thus prepared

A battery was fabricated as in Example 3 except that 50 mg of the strip of carbonaceous material was replaced by an equal amount of the sheet of carbonaceous material. The so fabricated battery was charged as in Example 3 by passing a constant (0.12 mA) current between the two electrodes until a coulometer read a value of 6.0 C.

Battery's performance

Immediately after the charging, the battery was discharged through a constant 50 kΩ resistance connected between the electrodes until the open circuit voltage between each electrode dropped to 2.5 volts. The quantity of discharged electricity was 3.1 C. The same constant resistance test was conducted after leaving the charged battery for 3 days. When the battery was discharged until the open circuit voltage became 2.5 volts, the 2.2 C of electricity was found to have been discharged.

Comparison

Table 1 shows the charge efficiencies (percent ratio of discharged electricity to charged electricity) of the batteries prepared in Examples 3 and 4 as compared with those of the battery made in Comparative Example 3. The batteries of Examples 3 and 4 were superior to the battery of Comparative Example 3 whether the discharge was conducted immediately after or three days after the charging.

TABLE 1

| | Charge Efficiency (%) | |
| --- | --- | --- |
| | Discharged Immediately after Charging | Discharged 3 days after Charging |
| Example 3 | 87 | 70 |
| Example 4 | 88 | 67 |
| Comparative Example 3 | 52 | 37 |

EXAMPLE 5

Poly(α-fluoroacrylonitrile) was dissolved in acetone and the solution was cast onto a glass plate. The web was dried with air to provide a film 500 μm thick. The film was placed in a quartz glass tube and evacuated. The glass tube containing the film was set in an electric heater and heated in vacuum to 300° C. at a rate of 10° C./min. The film was subsequently held at 300° C. for 1 hour, producing a black substrate film. This film was heated in a nitrogen stream to 1,200° C. at a rate of 20° C./min., and subsequently held at 1,200° C. for 1 hour.

Elemental analysis showed that the resulting film of carbonaceous material had a H/C atomic ratio of 0.18. X-ray wide-angle diffractiometry gave the following data: d002=3.51 Å and Lc=12 Å. The first differential of the absorption spectrum of electron spin resonance for the carbonaceous material had two signals and the respective interpeak line widths were 20 gauss and 60 gauss.

Battery using the electrode material thus prepared

A battery was fabricated as in Example 3 except that 50 mg of the strip of carbonaceous material was replaced by 50 mg of the film of carbonaceous material prepared above. The battery so fabricated was charged as in Example 3 by passing a constant (0.10 mA) current between the two electrodes until a coulometer read a value of 5.0 C.

Battery's performance

Immediately after the charging, the battery was discharged through a constant 50 kΩ resistance connected between two electrodes. An electricity of 4.4 C had been discharged by the time the open circuit voltage of the battery dropped to 2.0 volts. Charge-discharge cycles were repeated, and in the 4th cycle, 4.5 C of electricity was discharged as compared with 5.0 C that had been charged. After the 5th charging, the battery was left to stand for 15 hours and discharged through a constant 50 kΩ resistance. An electricity of 3.8 C was discharged as compared with 5.0 C of charged electricity. The charge efficiencies of the 1st, 4th and 5th charge-discharge cycles are shown in Table 2.

EXAMPLE 6

A 500 μm-thick film of poly(α-fluoroacrylonitrile) was heat-treated in vacuum at 300° C. as in Example 5, producing a black substrate film. The film was further heated in a nitrogen stream to 1,700° C. at a rate of 20° C./min., and held at 1,700° C. for 1 hour. The resulting film of carbonaceous material had a H/C atomic ratio of 0.05. X-ray wide-angle diffractiometry gave the following data: d002=3.45 Å and Lc=20 Å. The line width (ΔHpp) between peaks in the first differential of the absorption spectrum of electron spin resonance for the carbonaceous material was 930 gauss.

Battery using the electrode material thus prepared

A battery was fabricated as in Example 3 except that metallic lithium was replaced by 50 mg of the film of carbonaceous material which was wrapped with a 55-mesh nickel screen. The battery so fabricated was charged as in Example 3 by passing a constant 0.10 mA current until a coulometer read 5.0 C.

Battery's performance

Immediately after the charging, the battery was discharged with a constant 50 kΩ resistance connected between the two electrodes until the open circuit voltage between each electrode dropped to 1.0 volt. An electricity of 4.3 C had been discharged. Charge-discharge cycles were repeated, and in the 4th cycle, 4.4 C of electricity was discharged as compared with 5.0 C that had been charged. After the 5th charging, the battery was left to stand for 15 hours and discharged through a constant of 50 kΩ resistance. An electricity of 3.8 C was discharged as compared with 5.0 C of charged electricity. The charge efficiencies of the 1st, 4th and 5th charge-discharge cycles are shown in Table 2.

COMPARATIVE EXAMPLE 4

Pitch-base carbon fibers were set in an electric furnace and heated in a nitrogen stream to 3,000° C. at a rate of 20° C./min. The fibers were then held in a nitrogen stream at 3,000° C. for 1 hour. X-ray wide-angle diffractiometry of the resulting carbonaceous material gave the following data: d002=3.35 Å and Lc=230 Å. The line width (ΔHpp) between peaks in the first differential of the absorption spectrum of electron spin resonance was 5 gauss.

Battery using the electrode material thus prepared

A battery was fabricated as in Example 3 except that 50 mg of the strip of carbonaceous material was replaced by 50 mg of graphite carbonaceous material prepared above. The battery so fabricated was charged as in Example 3 by passing a constant 0.10 mA current between the electrodes until a coulometer read and electricity of 5.0 C.

Battery's performance

Immediately after the charging, the battery was discharged with a constant 50 kΩ resistance connected between the two electrodes. When the open circuit voltage between the electrodes dropped to 2.0 volts, an electricity of 0.71 C had been discharged. Charge-discharge cycles were repeated, and in the 4th cycle, 0.60 C of electricity was discharged as compared with 5.0 C that had been charged. After the 5th charging, the battery was left to stand for 15 hours and discharged through a constant 50 kΩ resistance. An electricity of 0.31 C was discharged as compared with 5.0 C of charged electricity. The charge efficiencies of the 1st, 4th and 5th charge-discharge cycles are shown in Table 2.

TABLE 2

| | Charge efficiency (%) | | |
|---|---|---|---|
| | 1st Cycle | 4th Cycle | 5th Cycle (discharged after 15-hour standing) |
| Example 5 | 88 | 90 | 76 |
| Example 6 | 86 | 88 | 76 |
| Comparative Example 4 | 14 | 12 | 6 |

As is clearly seen from the above data, the batteries made in Examples 5 and 6 were superior to the battery of Comparative Example 4 in that the former exhibited higher charge efficiencies not only in the 1st and 4th charge-discharge cycles, but also in the 5th cycle wherein discharging was conducted 15 hours after charging.

EXAMPLE 7

Benzene was subjected to oxidative cationic polymerization using a catalyst made of cuprous chloride and aluminum chloride. The resulting poly(paraphenylene) was not soluble in ordinary solvents such as benzene and toluene, and did not melt under heating up to 500° C.

A powder of the poly(paraphenylene) was heated in an electric furnace in a nitrogen stream to 600° C. at a rate of 10° C./min. The powder was subsequently held at 600° C. in a nitrogen stream for 1 hour, producing a black pyrolyzed powder of poly(paraphenylene). Electron spin resonance spectroscopy of this material gave a signal having a g-value of 2.0011. The line width ($\Delta Hpp$) between peaks in the first differential of the absorption spectrum for that signal was 12.3 gauss.

A portion (20 mg) of the pyrolyzed poly(paraphenylene) was wrapped with a 200-mesh nickel screen to make one electrode. The other electrode was made of 20 mg of metallic lithium. The two electrodes were separated by a fiberglass filter 0.5 mm thick.

The two electrodes were interconnected by a nickel wire lead. The resulting battery was charged by passing a constant 0.20 mA current from a potentionstat/galvanostat (HA-501 of Hokuto Denko K.K.), with the positive electrode connected to the electrode made of the pyrolyzed poly(paraphenylene) and the negative electrode connected to the electrode composed of metallic lithium. The charging was continued until a coulometer read a value of 4.0 C.

Immediately after the charging, the battery was discharged with a constant 1 k$\Omega$ resistance connected between the electrodes. An electricity of 3.12 C had been discharged before the voltage between the electrodes dropped to 1.5 volts.

Charge-discharge cycles were repeated and tin the 7th cycle, 3.21 C of electricity was discharged as compared with 4.0 C that had been charged. After the 8th charging, the battery was left to stand for 15 hours and discharged through a constant 1-k$\Omega$ resistance. The discharged electricity was 2.52 C as compared with the charged 4.0 C.

While the invention has been described in detail and with reference to specific embodiment thereof, it will be apparent to one skilled in the art that various changes and modifications can be made therein without departing from the spirit and scope thereof.

What is claimed is:

1. An electrode material which is a carbonaceous material obtained by pyrolyzing an organic compound capable of forming a graphite structure, said carbonaceous material having a pseudographite structure such that the spacing of (002) planes, d002, is at least 3.41 Å and not more than 3.70 Å and the crystallite size in the direction of a c axis, Lc, is at least 7.0 Å and not more than 70 Å, as determined by X-ray wide-angle diffractiometry, and the line width $\Delta Hpp$ between peaks in the first differential of the absorption spectrum of electron spin resonance is at least 10 gauss; and wherein the distance $a_0$, which is twice the spacing of the 110 planes, d 110, is at least 2.37 Å and not more than 2.47 Å; and further wherein the crystallite size in the direction of an axis, La, ranges from 10 to 80 Å.

2. The electrode material according to claim 1, wherein the line width ($\Delta Hpp$) between peaks in the first differential of the absorption spectrum is at least 12 gauss.

3. The electrode material according to claim 1, wherein said carbonaceous material is obtained by pyrolyzing said organic compound at between 300° and 3,000° C. and for a period ranging from 10 minutes to 20 hours.

4. The electrode material according to claim 1, wherein said organic compound capable of forming the graphite structure is at least one member selected from the group consisting of condensed polycyclic hydrocarbon compounds and polycyclic heterocyclic compounds.

5. The electrode material according to claim 4, wherein said organic compound capable of forming the graphite structure is least one member selected from the group consisting of tetracarboxylic acid diimide substituted compounds of benzene, naphthalene, isoquinoline, phthalazine, perylene, terylene, pyrene, chrysene or coronene.

6. The electrode material according to claim 1, wherein said organic compound capable of forming the graphite structure is (A) or the reaction product of (A) and (B):
    (A) a linear high-molecular weight novolak resin obtained by polycondensing an aldehyde compound with a mono-substituted phenol having a substituent on the ortho- or para-position in the presence of an acidic catalyst;
    (B) a curing agent.

7. The electrode material according to claim 6, wherein said linear high-molecular weight novolak resin has a number average molecular weight of at least 1,000.

8. The electrode material according to claim 1, wherein said organic compound capable of forming the graphite structure is at least one member selected from the group consisting of poly($\alpha$-haloacrylonitrile), poly-($\alpha$-haloacrylonitrile), poly(halodicyanoethylene), poly-(cyanoacetylene) and poly(dicyanoacetylene), the pyrolyzed carbonaceous material having a H/C atomic ratio of 0.010–0.55.

9. The electrode material according to claim 1, wherein said organic compound capable of forming the graphite structure is polyphenylene or poly(substituted phenylene).

* * * * *